United States Patent [19]

Birken et al.

[11] Patent Number: 5,024,740
[45] Date of Patent: Jun. 18, 1991

[54] MINERAL REFINEMENT BY HIGH RF ENERGY APPLICATION

[76] Inventors: Stephen M. Birken, 23 Mohawk Trail; Karl Birken, 38 Grant Hill Ct., both of Clifton Park, N.Y. 12065

[21] Appl. No.: 423,142

[22] Filed: Oct. 28, 1989

Related U.S. Application Data

[63] Continuation of Ser. No. 125,938, Nov. 27, 1987.

[51] Int. Cl.⁵ .................... C01G 23/00; C22B 1/00
[52] U.S. Cl. .................... 204/157.15; 204/157.4; 204/157.43; 423/76; 423/340; 75/10.1
[58] Field of Search ........... 204/157.15, 157.4, 157.43; 75/10.1; 423/76, 340

[56] References Cited

U.S. PATENT DOCUMENTS

| | | | |
|---|---|---|---|
| 2,553,944 | 5/1951 | Schlesman | 204/157.63 |
| 3,205,162 | 9/1965 | MacLean | 422/186.04 |
| 3,261,959 | 7/1966 | Connell | 75/10.13 |
| 3,948,601 | 4/1976 | Fraser | 422/23 |
| 3,981,687 | 9/1976 | Vig | 422/22 |
| 4,056,368 | 11/1977 | Rozmus | 55/2 |
| 4,207,286 | 6/1980 | Gut Boucher | 422/23 |
| 4,321,089 | 3/1982 | Kruesi | 75/10.13 X |
| 4,455,135 | 6/1984 | Bitterly | 432/1 |
| 4,572,735 | 2/1986 | Poetzschke | 75/10.13 |
| 4,818,510 | 4/1989 | Jung | 423/340 |

Primary Examiner—John F. Niebling
Assistant Examiner—Isabelle R. McAndrews
Attorney, Agent, or Firm—Schmeiser, Morelle & Watts

[57] ABSTRACT

A method and apparatus for the elimination of unwanted impurities and inclusions from a variety of nonconductive base materials by the application of high power, variable frequency RF energies in selective of rarefied atmospheres. Refined natural quartz is a product acquired by the method using the apparatus herein described.

6 Claims, 3 Drawing Sheets

MINERAL REFINEMENT BY HIGH RF ENERGY APPLICATION

This application is a continuation of application Ser. No. 125,938, filed Nov. 27, 1987.

FIELD OF THE INVENTION

This invention relates generally to beneficiation processes and, more specifically, comprises a method and apparatus for the selective removal, a refinement, of particular constituents from a crushed or pulverized mass by the application thereto of a powerful radio frequency (RF) energy field.

BACKGROUND OF THE INVENTION AND PRIOR ART DISCUSSION

Many processes, as well as apparatus, have been devised in order to selectively remove ore constituents from a crude mass (beneficiation) or in the alternative, remove unwanted inclusions from a particular substance. Processes employed to do such comprise various chemical, mechanical and electrical methods, including combinations of all three. Regardless of the type employed, generally a high energy input to the separation process is required. In processes involving the use of electrical energy to remove unwanted inclusions or impurities, various apparatus and electrical spectra have been employed.

U.S. Pat. No. 4,056,368 issued to Rozmus in 1977 discloses an apparatus and method for cleaning contaminated particulate material such as gas contaminated particulate material through the use of electrical field charges (electrostatic displacement). Significantly, Rozmus teaches a series of vacuum chambers surrounded by a series of external electrodes. Rozmus applies first an alternating current and, secondly, a direct current charge to the electrodes. Particulate matter is injected into the system and conducted through a series of conduits (chambers) by gravity and while subjected to vacuum conditions. Because of the nature of an electrostatic field, that is, the exertion of an undiminished force through a non-conducting material, the electrodes are positioned outside of the series conduit-vacuum chamber. The Rozmus process therefore entails deflection of charged particles that pass through the field. The vacuum system is intended to draw off only inert gases which have been ionized by contact or flow through the electrostatic fields. The Rozmus process and apparatus would not be efficacious where the beneficiation process was to remove, selectively, electric power-absorbing matter from a non-conductive material, say quartz. More importantly, since Rozmus contemplates the removal of contaminants comprising essentially gas molecules, he has deVised a system and process which essentially avoids eXtremes of heat. By contrast, and to serve the purposes of the instant inventor, it is necessary to employ high heat in order to vaporize the foreign inclusions found in non-metallic minerals.

Poetzschke, in 1986, was issued U.S. Pat. No. 4,572,735 for a PROCESS FOR SORTING METAL PARTICLES. The relevance of this teaching to the instant invention was that Poetzschke, his detailed means and the teaching of a method for identifying and sorting metal particles dependent on their chemical composition, by use of the melting point and/or the melting temperature range of the selective particles. Essentially, Poetzschke teaches the existence of a specific melting point, or points at which a change of state occurs, for a particular inclusion that is responsive to a particular energy input, notably that of a 400 Watt $CO_2$ laser. The instant inventor, extrapolating from the teachings of Poetzschke, determined that for his particular needs an "antenna" characteristic exhibited by conductive materials having definitive crystal structures would provide the physical parameters necessary to calculate the proper amount of energy required to vaporize a specific or particular inclusion in non-conducting material such as quartz.

It is known to those versed in the art that crystals or particles of conductive materials act to varying degrees as antennae and to varying degrees, depending upon wave length, exhibit resonant frequencies when introduced to an electromotive field. Given a variety of particulate inclusions, those crystalline inclusions being by way of physical length tuned to the frequency of the RF or electromotive field will absorb a disproportionately greater share of energy than the "non-tuned" inclusions. Thus, they will melt and vaporize sooner than the non-tuned inclusions.

Notwithstanding the immediately foregoing knowledge, it does not appear from an exhaustive study of the extant patent art that anyone has succeeded in developing the process and apparatus of the hereinafter disclosed invention. Indeed, Rozmus, in collaboration with Rozmus Jr. years later patented a vacuum chamber assembly which is to be used for degassing particulate material (U.S. Pat. No. 4,388,088) and appears to have concentrated more heavily on physical means for separation rather than electronic; although electronic means are suggested in the later patent.

SUMMARY OF THE INVENTION

Radio frequency (RF) energy is used to separate one substance from others. The selected substance is caused to change physical state i.e., by vaporizing to its gaseous form by its absorption of energy while in an RF field. The selected substance must be a conductor and have a resonant frequency responsive to the frequency of the RF field. An apparatus is constructed comprising a conduit or series of conduits that are subjected to near-vacuum conditions and into which is placed at least one pair of electrodes capable of sustaining intense heat and high quantities of RF energy. A mixture of a base substance containing discrete particles of impurities, or materials to be sorted out, is passed between the electrodes which have been connected to a high power RF oscillator and to ground. As the base material is passed between the electrodes, an intense RF field is generated on one of the electrodes and is transmitted through the material to the ground electrode. Particles in the base material, having a specific physical length, and therefore attuned to the RF energy frequency, near-instantaneously absorb sufficient energy to transition to the vapor state, and are immediately drawn off by vacuum means. The period of time required before a selected particulate is vaporized is proportional to the substance, quantity and rate of passage of the particulate between the electrodes, as well as the size and geometry of the base material elements.

The intricacies of the separation process are best illustrated by way of an example. In the process of purifying natural quartz, it is absolutely essential to remove an impurity known as rutile, a simple oxide of titanium. Rutile vaporizes at approximately 3,500° C. and the energy required to cause this phase change is approximately 163,800 calories per mole or 8,571 joules per gram of titanium dioxide (rutile). During the irradiation process, each discrete rutile crystal is vaporized as the entropy of the crystal is exceeded. A high content of the included rutile crystals are encapsulated by quartz and, because of the high internal stress of the vaporizing rutile, the quartz capsule is literally exploded. The gaseous rutile is immediately drawn off by the vacuum means and the quartz, purified of rutile inclusion, is collected at the end of the conduit in the separating apparatus.

In lieu of using the vacuum extraction, an atmosphere is provided in the electrode chamber(s), an atmosphere that will readily combine with the vaporized impurity to form a gaseous chemical compound and thus, be left behind as the base material (now purified) leaves the electrode proximity. Often times the resultant compound is solid but soluble in water; thus, it may be leached quite readily from the base material.

BRIEF DESCRIPTION OF THE DRAWINGS Of the Drawings.

DETAILED DESCRIPTION OF THE PREFERRED EMBODIMENT

An in situ operation using a portable (i.e. mobile) apparatus of the hereinafter described type is suggested and taught by the instant inventor concurrent with the instant teaching of the preferred embodiment. Such a mobile apparatus is merely a variation or alternate mode of expression and its usage would depend upon the needs and resources of the operator.

As mentioned in the Summary, the hereinafter described process employs either a vacuum pump to evacuate unwanted vapors from the chamber or the chamber is filled with a gas which will cause formation of an (impurity) compound that is naturally of gaseous form or is readily soluble in a common, inexpensive solvent. This technique is known to chemists and its application remains for the particular practitioner to use relative to the base materials being refined and the impurities (inclusions) to be extracted.

Figure 1:
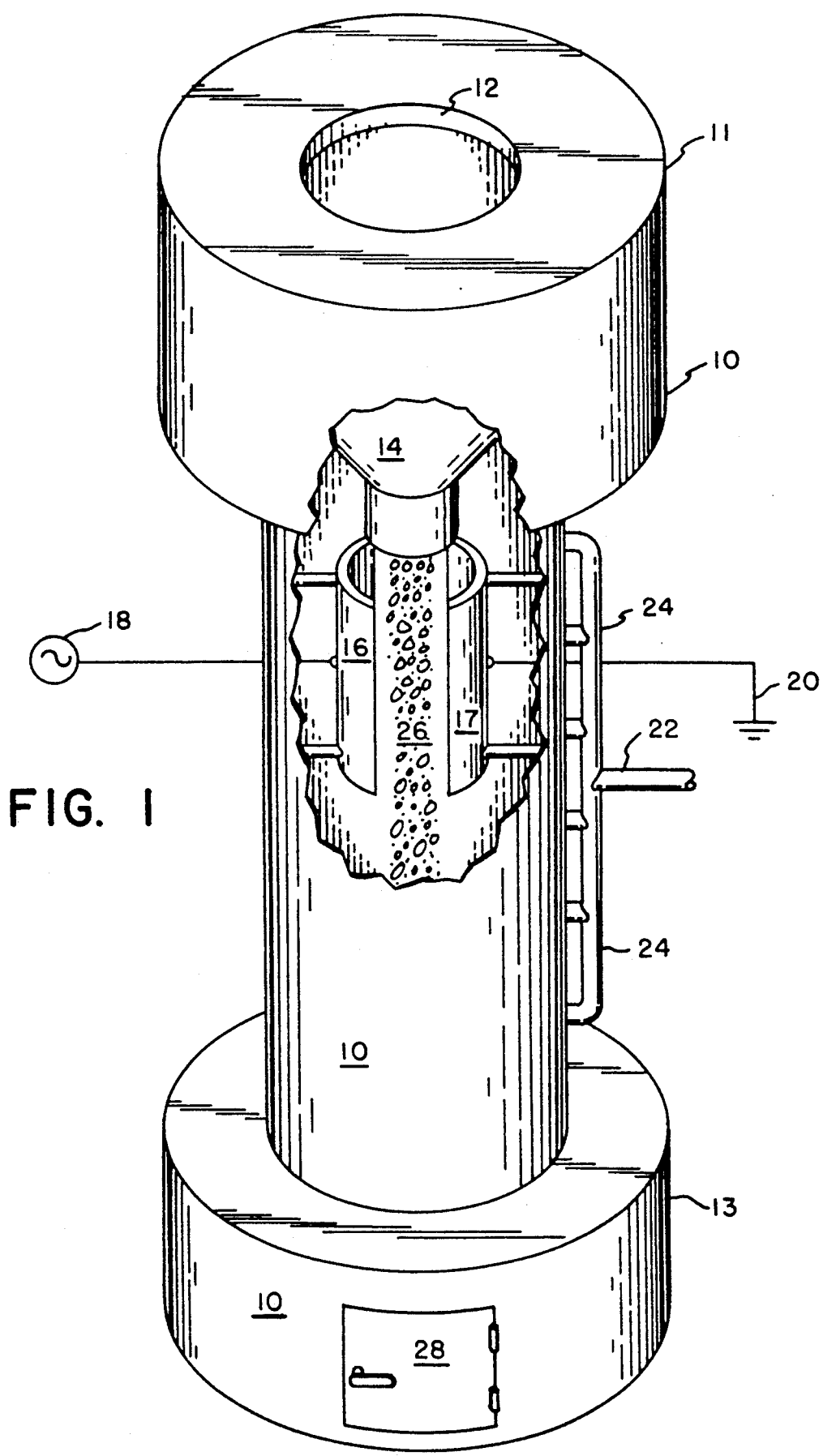
FIG. 1 is an isometric illustration of the preferred embodiment with cut away view of the electrode area.

Referring particularly now to FIG. 1, there is depicted in isometric illustration the preferred embodiment refinement apparatus 10 of the instant invention. The refinement apparatus 10 essentially comprises but a single cylindrical conduit having the inlet end 11 expanded somewhat to accommodate hopper means 14 and the lower end 13 expanded to accommodate the accumulator of base material 26. In the preferred embodiment, vacuum extraction line 22 communicates with vacuum collection manifold 24 so as to maintain the electrode 16, 17 area under less than atmospheric pressure conditions. Although it is possible to operate the invention at ambient atmospheric conditions, the application of a vacuum condition greatly enhances the extraction of the unwanted particulate matter or inclusions from the base material.

Fundamental to the invention herein disclosed are opposing electrodes 16, 17 through which the base material 26 flows, here, under gravity conditions. Connected to electrode 16 is an RF oscillator (generator) 18 which provides the RF energy field throughout a selective power and frequency spectra. Electrode 17 is grounded 20 thereby completing the path of RF energy from its source 18 through the base material flow 26 to ground 20. After base material 26 has been depleted of the specific undesired inclusion, or contaminant, and collected at conduit 10 base area 13, the apparatus is generally shut down for removal through access 28 of the enriched base material 26.

Figure 2:
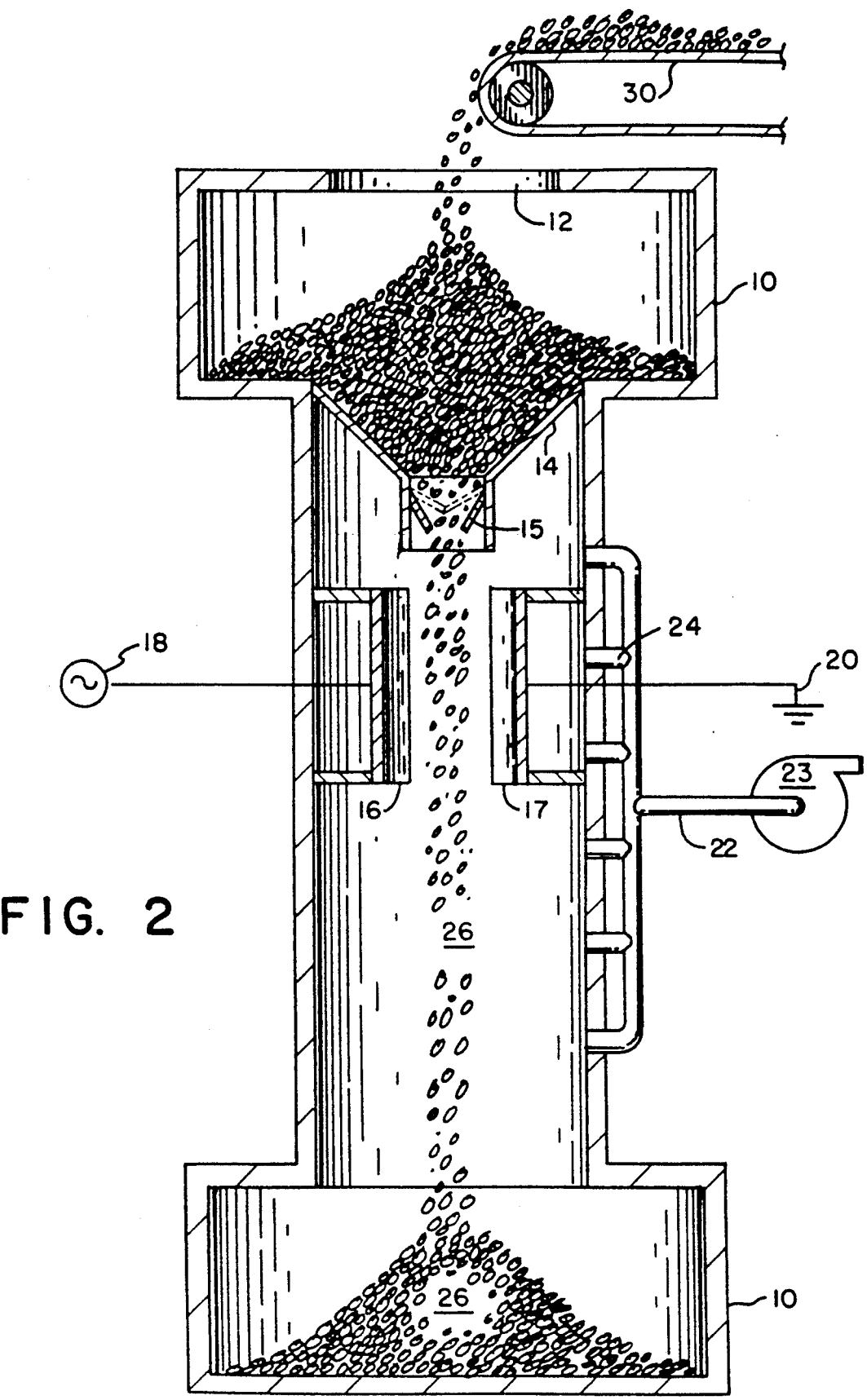
FIG. 2 is a sectional elevation of the preferred embodiment disclosing loading means to accommodate base material.

The sectional elevation of FIG. 2 more clearly defines the vacuum pump 23 which, operating through vacuum line 22 and vacuum manifold 24, serves to maintain the internal environs of the electrode chamber at less than ambient atmospheric pressure. Also readily apparent are the means at the apex of hopper 14 which comprise the base material metering apparatus 15. The reader shall observe that as conveyor 30 feeds the base material, generally in pulverized form, into the inlet end 11 of the refinement apparatus 10, it is immediately stored in the hopper 14. If less than atmospheric ambient pressures are required in the system inlet 12 is sealed and atmosphere is drawn out through line 22. Thereafter, depending upon the desired flow rate of base material 26 between electrodes 16, 17, the metering apparatus 15 is adjusted. As base material 26 is metered in its gravity flow between the electrodes, the RF oscillator which has been tuned to the appropriate frequency for a particular inclusion (the resonance frequency) is brought up to the desired power output for irradiation of the base material. Thereafter, the base material, (containing the undesired inclusion) passing between the electrodes 16, 17 is subjected to the high energy flux of the RF field with the result that the particular inclusions are vaporized, often shattering any encapsulation by the prominent base material. Vapors and gaseous contaminants are then drawn off along varying portions of the vacuum manifold 24. Certain contaminants undergo sublimation at various points proximate the vacuum manifold and may be collected after shut down of the main process. The reader should recognize that other beneficiation and metal extraction processes, relative to the recrystallization or sublimation of the vaporized inclusion matter logically follow the aforementioned eXtraction process; but, apparatus for such specific activities is left to later dissertation.

Figure 3:
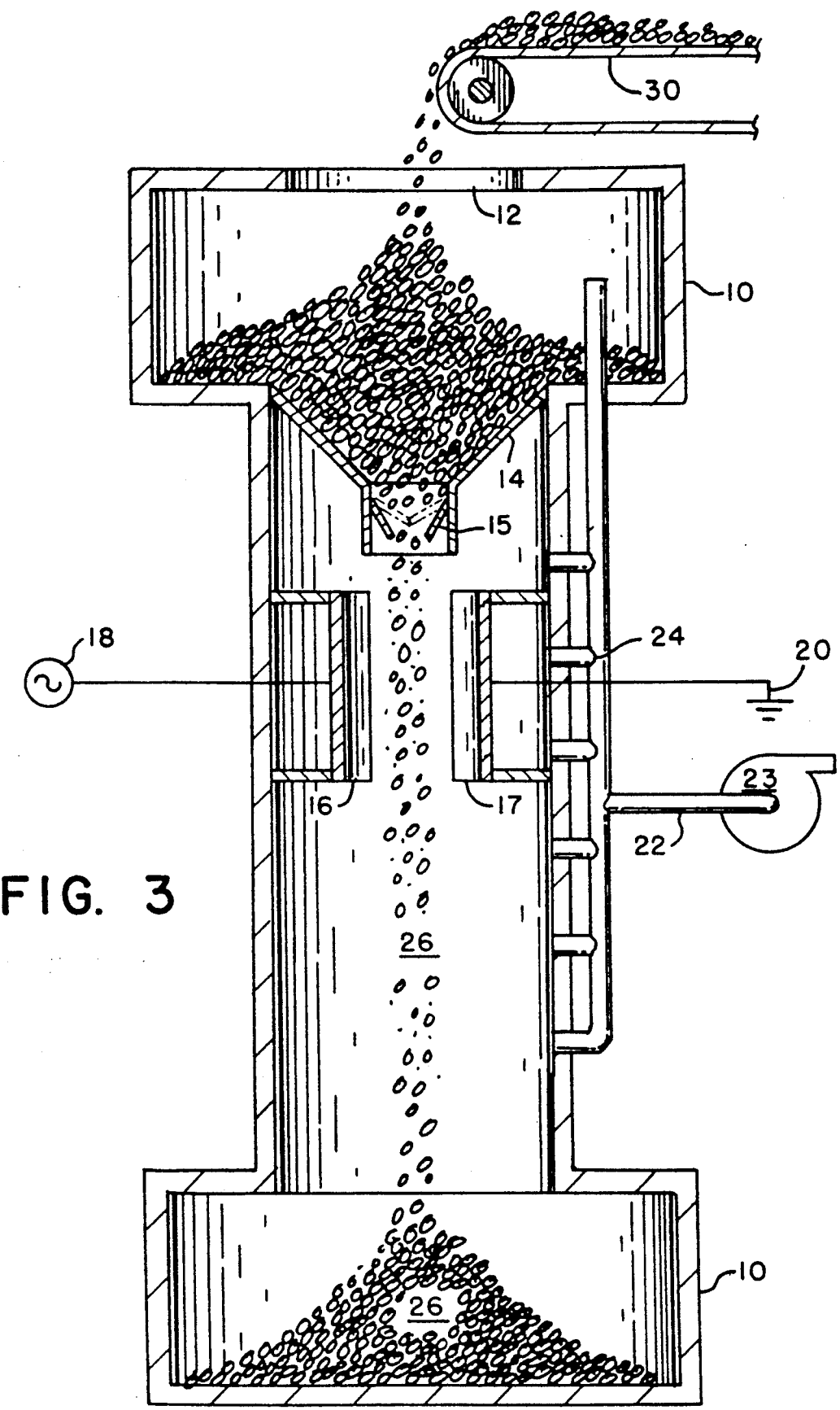
FIG. 3 is a sectional elevation of an alternate embodiment disclosing an alternate vacuum means.

FIG. 3 discloses an alternate embodiment wherein vacuum manifold enters the inlet end in order to create a vacuum in the hopper 14. With some materials this may be necessary in order to create a vacuum in the entire system prior to opening the metering apparatus 15.

The preceding disclosure of the invention in its preferred embodiment is provided so that the reader may gain some understanding as to its fundamental aspects and applications. It should be understood however that the inventor implies no limitations, save in the appended claims, to either his process or apparatus. Practice with the invention, particularly employing its capability of tuning the electrode-RF generator subassembly, will imbue the user with an appreciation with this powerful and versatile materials refinement tool.

What is claimed:

1. A method for refining a base material by selectively removing inclusions therefrom, said method consisting of the steps of:

transporting said base material through a confinement apparatus, in an atmosphere characterized by the absence of air, said transporting providing determinable amounts of said base material to pass through said confinement means;

irradiating, simultaneously with said transporting and at predetermined frequencies, said base material with alternating RF energy of sufficient power to selectively vaporize a particular inclusion to thus free it from said base material; and removing immediately thereafter said irradiating step, any vaporized inclusion matter by suitable means.

2. The method of claim 1 wherein said irradiating step further comprises:

selecting the inclusion to be removed from said base material and determining therefor the specific resonant frequency for said inclusion; and turning a generation source of said RF energy to said frequency.

3. The method of claim 2 wherein the inclusion is removed during said transporting via a vacuum.

4. The invention of claim 1 wherein said atmosphere consists of a gas which selectively combines with said vaporized inclusion matter.

5. A method for refining an ore consisting of the steps of:

a) transporting the base substance through a confinement means in the absence of air, the confinement means containing therein transporting means for providing a continuous flow of the base substance from which a selected substance is to be separated;

b) determining the selected substance to be removed from the base substance and further determining therefor a specific resonant frequency to which said selected substance will respond;

c) tuning an RF generator to said resonant frequency and irradiating simultaneously with said transporting the base material using high power RF energy at said resonant frequency which causes the selected substance to vaporize; and, d) isolating, concurrently, vaporized selected substance from the confinement means.

6. The method of claim 5 wherein transporting consists in gravity feeding the base substance from an inlet above the confinement means.

* * * * *